Patented Aug. 21, 1951

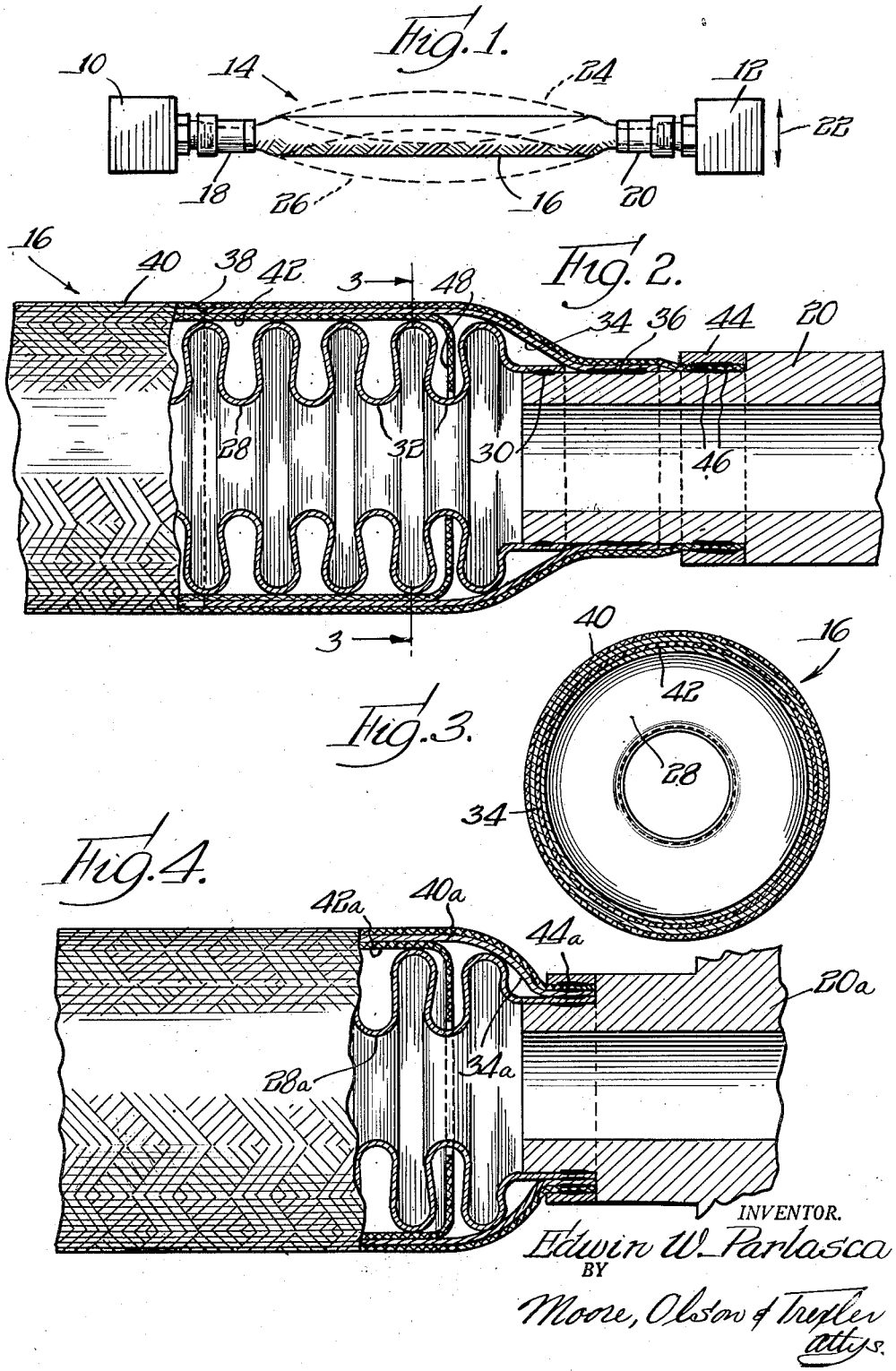

2,565,184

UNITED STATES PATENT OFFICE 2,565,184

FLEXIBLE TUBING UNIT

Edwin W. Parlasca, Elgin, Ill., assignor to Chicago Metal Hose Corporation, Maywood, Ill., a corporation of Illinois Application October 9, 1948, Serial No. 53,741

11 Claims. (Cl. 285—72)

This invention relates to flexible tubing, and sheathing and end coupling connections therefor, and concerns particularly flexible tubing installations which are subjected to vibration and the like.

Among the uses for flexible tubing are installations wherein the tubing is subjected to a relatively intense or rapid vibrating action in service. That is, the tubing may be interconnected between a pair of members, between which fluids are to be conducted, and wherein either one or both of said members experience a relatively rapid vibrating motion so as to transmit a similar vibrating action to the tubing.

In installations of this character difficulty is encountered due to premature rupture of the relatively frangible tubing, particularly at and adjacent the points where the tubing is secured to its end couplings or connections.

Further, in instances wherein the tubing is subjected to relatively high internal pressures sheathings such as flexible metal braids and the like are generally employed, and in such instances further difficulty is encountered with vibration due to wear between the braid and the tubing, particularly at the crests of the tubing convolutions.

In accordance with the present invention improved means and methods are provided for securing the ends of the tubing to the adjacent coupling connections, whereby to protect those convolutions which are particularly subject to rupture, and effect a distribution of stresses, so as to increase the durability of the unit. Further, means are provided for effecting the protection of the tubing convolutions, along the entire tubing length, to further increase and promote the durability of the construction in vibration installations.

It is accordingly an object of the present invention to provide an improved flexible tubing unit, particularly for use in vibrating installations, having improved durability and resistance to rupture.

A further object of the invention is to provide improved methods for effecting the fabrication of flexible tubing units of the foregoing character.

A still further object of the invention is to provide a flexible tubing unit, of the type set forth, which minimizes the difficulties heretofore encountered in tubing units of this character.

Various other objects, advantages and features of the invention will be apparent from the following specification when taken in connection with the accompanying drawings wherein certain preferred embodiments of the invention are set forth for purposes of illustration.

In the drawings, wherein like reference numerals refer to like parts throughout:

Fig. 1 is a general assembly view of a flexible tubing installation incorporating a tubing unit constructed in accordance with and embodying the principles of the present invention;

Fig. 2 is an enlarged longitudinal view, partly in section, and more particularly illustrating one tubing end and its associated end coupling connection, of the structure of Fig. 1;

Fig. 3 is a transverse sectional view of the structure of Fig. 2 on the line 3—3 thereof; and Fig. 4 is a view similar to Fig. 2 but illustrating a modified embodiment.

Referring more particularly to the drawings, and first to the embodiment illustrated in Figs. 1-3, in Fig. 1 there is shown a tubing installation comprising a pair of headers or machine parts 10 and 12 interconnected by means of a flexible tubing unit generally indicated by the reference numeral 14. The unit more specifically comprises a flexible tubing 16 provided with coupling connections 18 and 20 at the opposite ends thereof by which the tubing is interconnected between the headers 10 and 12 to effect the transmission of fluids, such as gases or liquids, therebetween. As further illustrated by the arrow 22, the header or machine part 12 may be subjected to vibration or reciprocation which if relatively rapid or intense causes the tubing to swing between limiting arcs as indicated by the dotted lines 24 and 26.

Flexible tubing may be of a number of different types, but in installations requiring complete fluid-tightness are generally fabricated of a unitary cylindrical metal blank helically or annularly corrugated to provide a series of flexible longitudinally spaced convolutions. In many installations, to provide the required degree of flexibility it is necessary that the tubing be fabricated of a relatively thin wall thickness which renders the convolutions frangible and readily susceptible to abrasion and rupture due to bending. Further, if the conducted fluids are at relatively high pressure, which results in the imparting of an end thrust to the oppositely disposed end coupling connections for the tubing, it frequently is necessary to apply a sheathing in the form of a flexible metal braid to the tubing so as to absorb such end thrust and make the unit comprising the tubing and its end coupling connections balanced longitudinally as well as laterally to the pressures of the fluids conducted.

A vibrating motion, such as indicated by the lines 24 and 26 in Fig. 1, results in a premature rupture of the tubing convolutions immediately adjacent the end couplings 18 and 20, due to the fact that an undue proportion of the flexing stresses are localized within such convolutions. Furthermore, the relatively large range of movement of which the tubing may partake, as indicated by said lines 24 and 26, results in a high degree of abrasion between the aforementioned flexible metal sheathing and the extreme crest portions of the convolutions, in turn resulting in a wearing and abrading action which may rupture the tubing convolutions at any point along the length of the tubing where such abrading action reaches an inordinate amount.

Referring to Figs. 2 and 3, the convoluted metal tubing is specifically shown at 28, secured at its end to the coupling piece 20 by means of a circumferential resistance weld 30. As is known, in flexible convoluted metal tubing the trough portions of the convolutions are subjected to the greatest stress, which in the installation shown tends to impart an undue stress to the trough portions 32 of those convolutions which are immediately juxtaposed to the coupling piece, due to the vibration and flexing movements heretofore described. In accordance with the present invention a transition sleeve member 34 overlies a predetermined number of the tubing end convolutions, approximately five in the particular embodiment illustrated, and has its secured end portion anchored to the coupling member by means of a circumferential resistance weld as indicated at 36. The opposite or free end portion 38 of the transition sleeve lies between an outer metallic braid sheathing 40 and an inner metallic braid sheathing 42, the functions and purposes of which will be presently described.

In accordance with the present invention the transition sleeve 34 is preferably comparable in thickness and stock to the convoluted tubing 28, and in the particular embodiment illustrated both may be stainless steel sheet material of a wall thickness from .003" to .020" depending upon the installation requirements. Disregarding the inner braid 42, the clearance between the transition sleeve and the crest portions of the tubing convolutions may be approximately .010" to .015", the transition sleeve and tubing thus having what might be termed an "easy fit." By thusly matching the thickness and character of the transition sleeve with the thickness and character of the tubing stock, and providing an easy fit between the parts, as set forth, a desired proper degree of looseness is provided between the tubing and the transition sleeve, and a proper degree of flexing of the transition sleeve itself is provided, whereby to properly distribute the flexing stresses over a relatively large number of tubing end convolutions; preventing the localizing of stresses at the extreme end convolutions such as indicated at the points 32. In other words, the easy fit of the parts and the yieldability of the transition sleeve itself effect a distribution of the stresses, as compared, for example, with an action which would result were the transition sleeve of rigid material and tightly encompassing the tubing which would merely effect a shift of the localized stresses from the end convolutions of the tubing to those immediately adjacent the outer end 38 of the transition sleeve.

It will be noted that the free end 38 of the transition sleeve underlies and is protected by the outer metal braid 40, such braid thus serving the dual purpose of reinforcing the tubing, axially, and also encompassing the transition sleeve for both appearance and protective purposes. The end of the braid 40 is anchored to the coupling body 20 by means of a braid sleeve 44 and circumferential resistance welding as indicated at 46. Such braid connection may be effected, for example, in accordance with the means and methods set forth in the patent to Fentress et al. No. 2,319,220, dated May 18, 1943, and entitled "Braid Securing Method and Means." The outer braid 40 is preferably of relatively strong material, stainless steel in the particular embodiment shown, whereby, in combination with the firm anchorage 46, the braid is strongly resistant to longitudinal fluid stresses applied to the unit.

While the relatively tough braid 40 thus serves its desired purpose in imparting strength to the unit, it has the disadvantage that the relatively tough material of which it is constituted effects an abrading action upon the crests of the tubing convolutions, which abrading action is increased by the firm anchorage of the braid ends which prevents any give of the braid structures. In accordance with the present invention this abrading action is precluded by the interposition of the inner braid 42 between the outer braid and the tubing convolutions, the inner braid 42 being of relatively soft material, such as copper. While the inner braid may be secured at its ends, if desired, preferably and in the particular embodiment shown, the end 48 of the inner braid is left loose and merely extends into and lies within the end tubing convolution. This loose end arrangement for the braid permits it to conform at all times with the movements of the tubing, to a maximum extent, thus acting as a protective cushion between the rigidly secured outer braid 40 and the crest portions of the tubing convolutions. Not only is the material of the inner braid softer, but relative motion between such braid and the tubing is minimized, thus minimizing abrasion and wear to a desired maximum degree. The material and mounting of the inner braid thus both combine to effect the desired results, and the mounting of the braid is also such that the unit may be readily fabricated.

In the assembly of the structure the transition sleeve 32, when secured by the weld 36, acts as a retention means for the inner braid 42, thus facilitating the drawing of the outer braid 40 over the inner braid without buckling or crumpling, to provide the completed unit.

In Fig. 4 a structure is shown, functionally similar to the embodiment previously described, but wherein the tubing as indicated at 28a, transition sleeve 34a, and the outer braid 40a are all secured to the coupling piece 20a by means of a braid sleeve 44a and a single circumferential resistance weld which effects the simultaneous securing of the several parts, for simplicity of fabrication. It is believed that the method of fabricating the unit of Fig. 4, and the functional characteristics thereof, will be clear from what has heretofore been set forth in reference to Fig. 1–3.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A flexible tubing unit comprising a convoluted metal tubing, a coupling piece, means securing the tubing end to the coupling piece forming a fluid-tight connection, and a transition sleeve anchored adjacent one end thereof to the coupling piece and having its opposite free end extending over a predetermined number of the end convolutions of the tubing in loosely embracing engagement therewith.

2. A flexible tubing unit as defined in claim 1, wherein the transition sleeve is of a wall thickness and metal stock substantially similar to the wall thickness and stock of the tubing.

3. A flexible tubing unit as defined in claim 1, wherein the means securing the tubing end to the coupling piece comprises an annular resistance weld, and wherein the secured end of the transition sleeve is annular resistance welded to the coupling piece circumferentially thereof.

4. A flexible tubing unit comprising a convoluted metal tubing, a coupling piece, means securing the tubing end to the coupling piece forming a fluid-tight connection, a transition sleeve anchored adjacent one end thereof to the coupling piece and having its opposite free end extending over a predetermined number of the end convolutions of the tubing in loosely embracing engagement therewith, and a metallic braid sleeve encompassing the tubing and the transition sleeve and having one end thereof secured to the coupling piece.

5. A flexible tubing unit as defined in claim 4, wherein the tubing end, the transition sleeve, and the metal braid are secured to the coupling piece by means of annular resistance weld means extending circumferentially of the coupling piece.

6. A flexible tubing unit comprising a convoluted metal tubing, a coupling piece, means securing the tubing end to the coupling piece forming a fluid-tight connection, an outer metal braid encompassing the tubing and secured at one end to the coupling piece, and an inner metal braid interposed between the outer braid and the tubing along a predetermined length thereof, said inner braid being of softer material than the outer braid and serving to prevent abrasion between the outer braid and tubing.

7. A flexible tubing unit comprising a convoluted metal tubing, a coupling piece, means securing the tubing end to the coupling piece forming a fluid-tight connection, an outer metal braid encompassing the tubing and secured at one end to the coupling piece, and an inner metal braid interposed between the outer braid and the tubing along a predetermined length thereof, said inner braid being unconnected to the coupling piece and being retained in position by the outer braid.

8. A flexible tubing unit comprising a convoluted metal tubing, a coupling piece, means securing the tubing end to the coupling piece forming a fluid-tight connection, an outer metal braid encompassing the tubing and secured at one end to the coupling piece, and an inner metal braid interposed between the outer braid and the tubing along a predetermined length thereof, said inner braid being of softer material than the outer braid and serving to prevent abrasion between the outer braid and tubing, and said inner braid being unconnected to the coupling piece and being retained in position by the outer braid.

9. A flexible tubing unit comprising a convoluted metal tubing, and a pair of metal braid sleeves encompassing the tubing, the inner braid being of softer material than the outer braid and serving as an abrasion preventing means between the outer braid and tubing.

10. A flexible tubing unit comprising a convoluted metal tubing, a coupling piece, means securing the tubing end to the coupling piece forming a fluid-tight connection, a transition sleeve anchored adjacent one end thereof to the coupling piece and having its opposite free end extending over a predetermined number of the end convolutions of the tubing in loosely embracing engagement therewith, an outer metal braid encompassing the tubing and transition sleeve and secured at its end to the coupling piece, and an inner metal braid interposed between the outer braid and the tubing and between the transition sleeve and the tubing and forming an abrasion resistant encasement for the tubing and transition sleeve structures.

11. A flexible tubing unit as defined in claim 10, wherein said inner braid is of softer metal than the outer braid and is unconnected to the coupling piece.

EDWIN W. PARLASCA.

REFERENCES CITED

The following references are of record in the file of this patent:

UNITED STATES PATENTS

| Number | Name | Date |
| --- | --- | --- |
| 2,351,416 | Fentress | June 13, 1944 |
| 2,363,586 | Guarnaschelli | Nov. 28, 1944 |